United States Patent Office 3,047,977
Patented Aug. 7, 1962

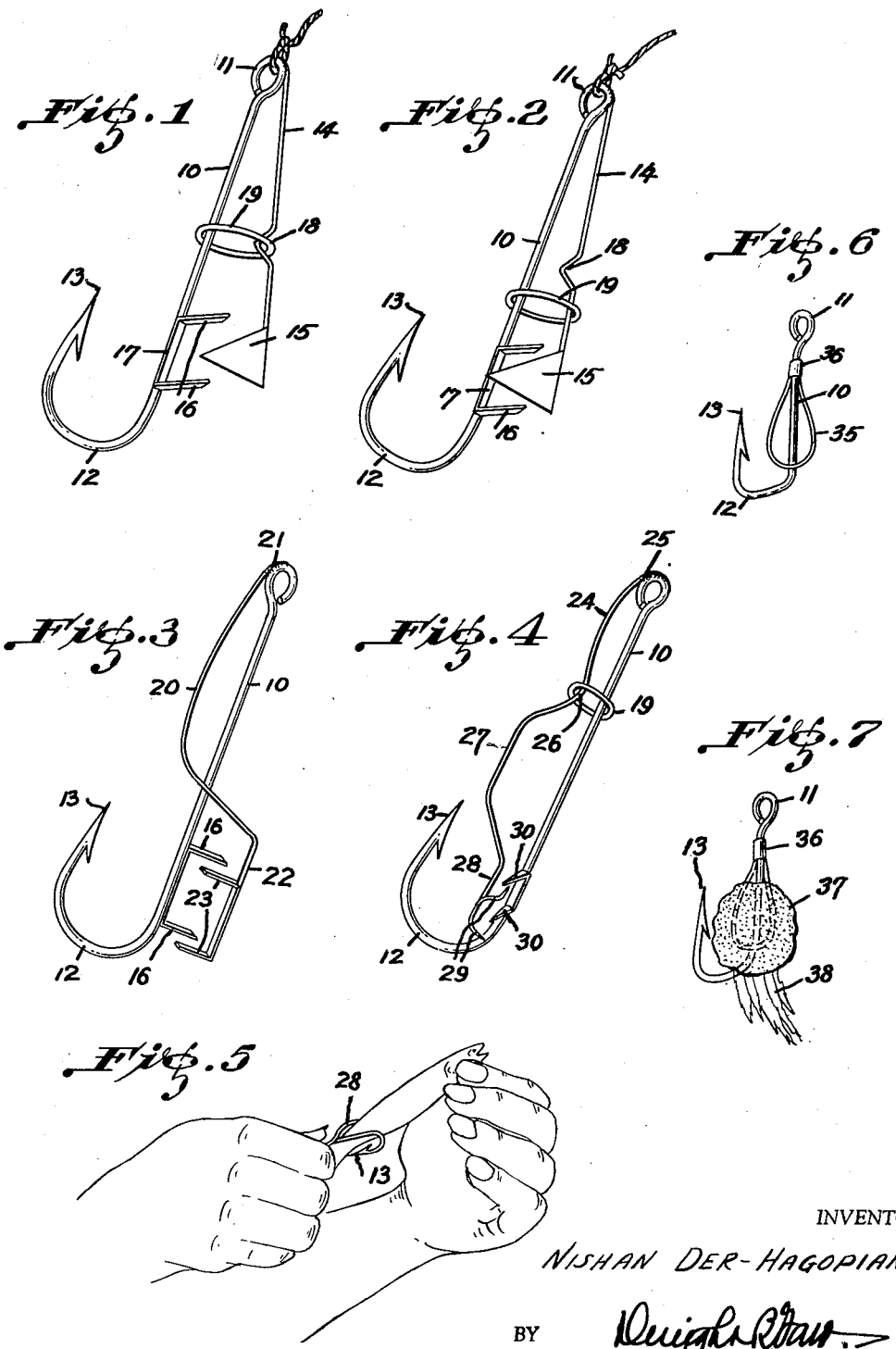

3,047,977
FISH HOOKS
Nishan Der-Hagopian, P.O. Box 75779, Station S,
Los Angeles, Calif.
Filed Feb. 29, 1956, Ser. No. 568,509
1 Claim. (Cl. 43—44.8)

This invention pertains generally to fish hooks, particularly to hooks equipped with lures either animate or inanimate to attract the fish.

A primary object of the invention is to provide a hook equipped with means whereby the lure, either animate or inanimate, may be securely attached to the hook and maintained in proper position thereon without danger of becoming detached or lost from the hook during normal fishing operations.

A further object of the invention is to provide a conventional fish hook with means whereby an animate lure, such as a minnow or other small fish, may be firmly held in proper relation to the barb of the hook without serious injury to the lure, thus enabling the bait to remain alive for a considerable length of time.

A still further object of the invention is to provide means associated with a conventional fish hook for properly impaling the live bait in proper association with the hook barb and in such manner that the bait may remain alive for a considerable length of time and without possibility of the bait escaping or being lost from the hook.

A still further object of the invention is to provide means associated with the conventional fish hook for impaling live bait in proper relationship to the hook barb and which may be readily manipulated in either impaling or removing the bait without the requirement of special skill, knowledge or technique.

A further object of the invention is to provide means readily attachable to conventional fish hooks for securing the lure, either animate or inanimate in proper relationship to the hook barb and which positively maintains the lure against loss or detachment either in casting or reeling operations.

With the foregoing objects in view, together with others which will appear as the description proceeds, the invention resides in the novel construction, combination and arrangement of parts, all as will be described more fully hereinafter, illustrated in the drawing, and particularly pointed out in the claim.

In the drawing:

FIG. 1 is a perspective view of a conventional fish hook showing as attached thereto an impaling means involving one form of the invention, the view showing the impaling means in "open" position, FIG. 2 is a similar view showing the impaling means in clamped or "closed" position, FIG. 3 is a perspective view of a conventional fish hook showing a modified form of the bait impaling means, FIG. 4 is a similar view of a modified form of impaling means, the view showing the position the parts will assume with the impaling means in "open" position, FIG. 5 is a perspective view illustrating the manner in which a lure, such as a live minnow, is applied to the hooks of the form above described, FIG. 6 is a perspective view of a further modification of lure impaling and retaining means, and FIG. 7 is a view similar to FIG. 6 and illustrating the inanimate lure attached to the impaling means.

Referring now more particularly to the drawing, and particularly to FIGS. 1 and 2 thereof, the hook is of conventional form and comprises the straight shank 10 of a desired length, provided at one end with a loop or other means 11 to effect connection between the hook and the fish line. The opposite end of the shank is provided with the integral curved hook 12 having the usual barb 13 at its free end.

Secured to the shank 10 adjacent to the eye end thereof as by welding, soldering or other preferred means, is one end of a spring arm 14, the said arm in the present instance being substantially straight throughout its length and of a length somewhat shorter than the straight shank 10 of the hook. This arm is so attached to the hook as to be capable of swinging toward or away from the back of the shank 10, and is provided at its free end with a sharpened prong 15 extending from the arm in the direction of the hook shank. The shank 10 is provided on its rear face with a pair of spaced impaling members or spurs 16 having their rear or free ends sharpened or pointed. In the present instance, these impaling members are spaced apart a distance sufficient to permit the prong 15 to engage or pass between them. The impaling members may be formed in the manner shown, that is, of a metallic member bent upon itself to provide a bight portion or base 17 to be rigidly secured as by welding or soldering to the back of the hook shank 10 with its impaling members 16 in parallelism wtih one another and at right angles to the base 17.

The arm 14 is provided inwardly from its ends with a depressed or recessed portion 18 to be engaged by a ring 19 encircling both the arm 14 and the shank 10. This ring may slide freely along the shank and arm and is of such diameter as when moved outwardly beyond the depressed portion 18 of the arm, it will force the arm 14 inwardly toward the shank 10 and dispose the prong 15 between the spaced impaling members 16 as shown in FIG. 2. When in this position, the spring arm 14 will be locked by the ring 19 in bait impaling position. When the ring is moved in the reverse direction, that is, toward the loop 11 of the hook, the spring arm 14 will move outwardly away from the shank 10 to withdraw the prong 15 from between the impaling members 16.

It is obvious from this construction that a lure or bait, either animate or inanimate, may be securely attached to the hook immediately adjacent to the barb 13 thereof and held firmly in position and against any possibility of becoming liberated from the impaling members and the prong. In instances where live bait is employed, the impaling members will pass through the fleshy parts of the fish body so that its vital organs will not be harmed. When thus impaled, when the ring is moved to the position as shown in FIG. 2, the lure will lie immediately adjacent to the barb and will remain alive indefinitely while the hook is in the water. To detach the bait for replacement purposes, it is but necessary to withdraw the ring 19 to the loop end of the shank 10 to permit the spring arm 14 to move outwardly to releasing position.

The same inventive ideal is present in the hook structure shown in FIGS. 3 and 4 of the drawing. In the first of these views, the spring arm 20 is substantially S-shaped and is secured at one end as by soldering or welding at 21 to the loop end of the hook and extends in substantial parallelism therewith for substantially half the length of the shank 10, at which point it is bent at a substantial angle to pass or cross the shank 10, after which it is straightened into substantial parallelism with the shank to provide the supporting end 22. The shank of the hook is provided with the spaced impaling members 16 as in FIGS. 1 and 2, while the inner surface of the spring arm portion 22 has attached thereto impaling barbs 23 in all respects similar to those indicated at 16 and projecting toward the shank 10. It will also be noted that the impaling barbs 23 are so positioned on the portion 22 of the spring arm 20 that they interfit with the rigid impaling members 16. In this form of the invention, the tension of the spring 20 is to force the barbs 23 toward the shank 10 so that the spring action of the arm 20 normally holds the bait impaled upon the members 16 and barbs 23. When it is desired to remove the bait or to apply a fresh bait, the spring arm 20 is depressed or moved in the direction of the straight shank 10 of the hook, whereby the barbs 23 will be moved from interengagement between the impaling members 16 to release the bait. When a fresh bait is applied between the shank and the portion 22, the release of pressure upon the spring arm 20 will enable the latter to resume its normal position to securely impale the bait in proper position with respect to the barb 13.

In FIG. 4 of the drawing, the spring arm 24 is secured as by welding or soldering as at 25 to the loop end of the shank 10 on that side adjacent to the barb 13. This spring arm has an inwardly deflected portion 26 adjacent to its mid portion, after which it is bent outwardly in the direction of the barb 13 and in parallelism with the shank 10 as indicated at 27, after which it extends inwardly toward the shank and is provided with a straight portion 28 to which spaced barbs 29 are attached. These barbs are so positioned upon the spring arm as to fall between the spaced barbs 30 rigidly affixed to the hook shank near its juncture with the hook portion 12 thereof. In this form of the invention when the ring 19 is seated in the recess 26 in the spring arm, the barbs or impaling members 29 are removed from interengagement between the impaling members 30 on the hook shank, but when moved outwardly of the shank so as to engage the hump portion 27 the free end of the spring arm 24 is moved inwardly so as to position the barbs 29 in interengagement between the cooperating barbs 30 affixed to the hook shank. The bait interposed between these impaling members and bars will thus be firmly held to the hook in proper position adjacent to the barb 13. The ring 19 thus securely locks the spring arm in proper impaling position.

FIG. 6 of the drawing shows a further modification, wherein the conventional hook provides the straight shank 10, the hook portion 12, the barb 13 and the loop 11 at the outer end of the shank. Rigidly secured to the shank portion is a spring steel rod looped in the manner shown as at 35 and having its ends enclosed by a retaining element indicated at 36. This element may constitute a ring or may be cord or wire tightly wrapped around the ends of the loop 35. This loop is positioned immediately adjacent to the barb portion 13 of the hook and extends laterally of the same. It will be observed that this loop also provides a broadened area for engagement with a lure, either animate or inanimate. In this form of the invention it is preferred that inanimate lure be employed, the material of which is well known to those skilled in the art and is of a pliable substance to be molded upon the shank as well as the arms of the loop 35. This type of lure is indicated at 37 in FIG. 7 of the drawings and may be provided with feathers 38 or other colored or uncolored materials attractive to fish. The hook so constructed provides adequate support for the lure and firmly maintains it at all times in proper relationship to the barb 13 of the hook.

From the foregoing it is apparent that I have provided a fish hook capable of firmly retaining the lure, whether animate or inanimate, at all times in proper relationship to the hook. The impaling means is so constructed and arranged as to cause the least possible damage to the lure in the event it be of the animate character, thus enabling live bait such as minnows or other small fish to remain alive an indefinite time. In instances where artificial or inanimate bait is used, the impaling means firmly holds the bait properly associated with the hook against any possibility of being removed or detached by accident. Moreover, the retaining means here described firmly maintains the lure in proper position upon the hook during casting or reeling operations as well as in instances where the hook may become fouled during the fishing operation.

I claim:

A fish hook comprising a substantially straight shank having a hook offset from one side thereof near one end and a pair of spaced apart impaling prongs offset from the opposite side thereof adjacent to the offset of said hook, means at the opposite end of said shank for attachment to a fish line, a substantially S-shaped spring arm secured at one end to said shank adjacent to said line attaching means and having its free end disposed over the shank of said hook and movable toward or away from said impaling prongs, and having prongs projecting from the free end of said spring arm toward said shank and so positioned upon the arm as to move between said prongs when the free end of the arm is moved toward said shank.

References Cited in the file of this patent

UNITED STATES PATENTS

| | | |
|---|---|---|
| 1,249,342 | Dahl | Dec. 11, 1917 |
| 1,325,530 | Ore | Dec. 23, 1919 |
| 2,215,612 | Hathaway | Sept. 24, 1940 |
| 2,257,403 | Vandine | Sept. 30, 1941 |
| 2,273,582 | Maire | Feb. 17, 1942 |
| 2,330,517 | Rigandi | Sept. 28, 1943 |
| 2,679,708 | Matthes | June 1, 1954 |
| 2,697,295 | Hinds | Dec. 21, 1954 |
| 2,710,481 | Matthes | June 14, 1955 |
| 2,745,208 | Zech | May 15, 1956 |

FOREIGN PATENTS

| | | |
|---|---|---|
| 23,457 | Great Britain | of 1894 |